United States Patent [19]
Gilchrist

[11] 3,887,442
[45] June 3, 1975

[54] POLYMERIZATION PROCESS
[75] Inventor: Allan E. Gilchrist, Westlake, Ohio
[73] Assignee: SCM Corporation, New York, N.Y.
[22] Filed: Mar. 8, 1971
[21] Appl. No.: 122,001

Related U.S. Application Data
[63] Continuation-in-part of Ser. No. 91,905, Nov. 23, 1970, abandoned.

[52] U.S. Cl. .................................................. 204/72
[51] Int. Cl. ...................... C07c 29/06; C08g 17/00
[58] Field of Search .................. 204/73 A, 72, 73 R

[56] References Cited
UNITED STATES PATENTS

| | | | |
|---|---|---|---|
| 3,427,234 | 2/1969 | Guthke et al. | 204/73 A |
| 3,489,663 | 1/1970 | Bayer et al. | 204/59 |
| 3,492,209 | 1/1970 | Miller | 204/73 A |
| 3,511,762 | 5/1970 | Childs | 204/59 R |
| 3,511,765 | 5/1970 | Beck et al. | 204/73 A UX |

Primary Examiner—F. C. Edmundson
Attorney, Agent, or Firm—Merton H. Douthitt

[57] ABSTRACT

Monomer, prepolymer, or oligomer feed that is polymerizable into a fluent polymer is dispersed with electrolyte in an autoionizable liquid bath, such as an aqueous bath, and percolated through a porous, charged d.c. electrode for promoting its polymerization into synthetic resin.

2 Claims, 1 Drawing Figure

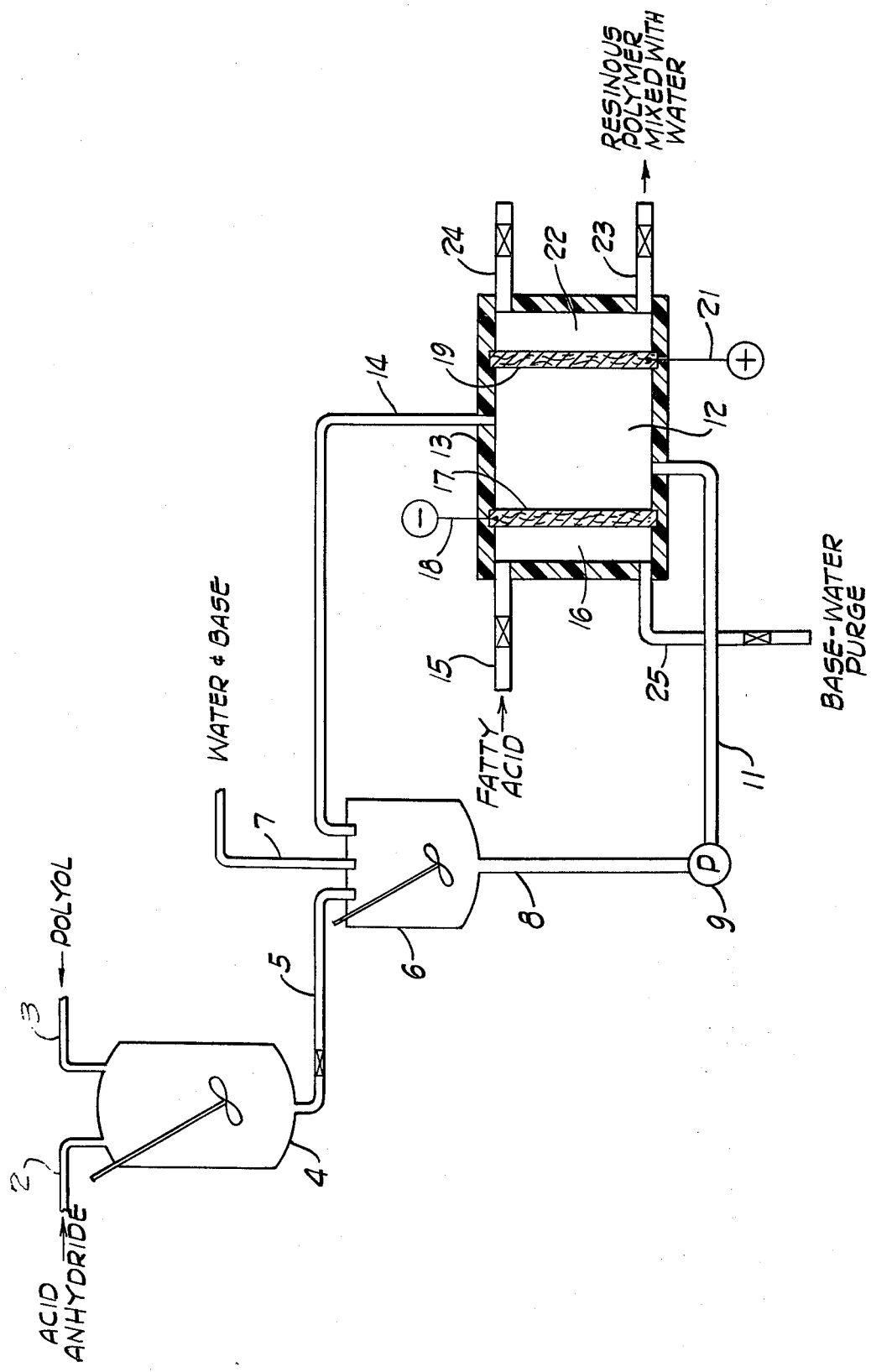

POLYMERIZATION PROCESS

This patent application is a continuation-in-part of my copending U.S. patent application Ser. No. 91,905, filed Nov. 23, 1970, and now abandoned entitled "Process and Apparatus for Electrolytic Treatment of Liquors Using Porous Deposition Electrode" (I-1586-2), the teachings of which are incorporated herein by reference.

In the art of electrochemistry a variety of electrolytic cell polymerizations have been described. Representative of perhaps the most pertinent patent disclosures in this art are the following: U.S. Pat. Nos. 2,676,918 (polymerization of tung oil); 2,961,384 (polymerization of phenol); 3,427,233 (homopolymerization of maleic anhydride); 1,580,795 (electrodeposition of rubber with vulcanizing agents); 2,726,204 (addition polymerization); 3,437,570 (polymerization of aromatics); 3,464,849 (polymerization of diacetone acrylamide); and British Pat. No. 623,355 (aminotriazine-aldehyde condensation).

Pertinent articles in such field include: Funt et al., *Polymer Letters*, Vol. 1, pp. 181-3 (1963) "Electroinitiated Polymerization of Vinyl Pyrrolidone"; Oliver, "Electropolymerization—A New Technique for Applying Paint," *Products Finishing*, Apr., 1970, pp. 66-71; and Funt et al., *C&EN*, Sept. 10, 1962, p. 63, teaching homogeneous systems for polymerizing monomers such as methylmethacrylate, acrylonitrile, and styrene in dimethylformamide with sodium nitrate and other salts as supporting electrolytes. In the last-mentioned article initiating ionic polymerization by electrolytic discharge of ions at the anode is described with most of the polymer forming on the cathode. Propagation is thought to occur by both ionic and free radical mechanisms simultaneously. Other relevant references are: Funt, "Electrolytically Controlled Polymerizations," *Macromolecular Reviews*, Vol. 1, starting at page 35 (John Wiley & Sons, London); C. L. Wilson, *The Encyclopedia of Electrochemistry* (1964), starting at page 963 (Reinhold Publishing Company, New York); and Bogenschutz et al., "Elektropolymerization," *Galvanaotechnik*, 60, (1969) No. 10, starting at page 750.

Such polymerizations should be distinguished from simply high frequency heating to cure resins such as reactive solutions of unsaturated polyesters (French Pat. No. 1,134,871 of 1957) and the preparation of polymers such as acrylic polymers by glow discharge electrolysis (U.S. Pat. No. 2,632,729).

There is also much art on electrochemical coupling, hydrodimerization, and preparation of low molecular weight polymers, representatively: U.S. Pat. Nos. 3,193,475 to 3,193,483, inclusive; 3,245,889; 3,415,725; 3,427,234; 3,440,154; 3,497,429; and British Pat. No. 967,956. U.S. Pat. No. 3,527,617 shows an electrolytic cyclone separator and reactor.

The preparation of various organometallics and the oxidation, reduction, simple esterification, halogenation and dehalogenation, etc. of organic compounds electrochemically is shown in a number of U.S. patents. Perhaps the most pertinent to this invention is U.S. Pat. No. 3,247,085 which shows the preparation of methyl ethyl ketone from a butene using a porous electrode. Preparation of simple esters such as methyl acetate is shown in U.S. Pat. No. 3,326,784. Other patents illustrative of these operations are: 2,135,368; 2,419,515; 2,439,425; 2,449,225; 2,537,304; 2,680,713; 2,829,094; 3,247,084; 3,344,045-048 inclusive; 3,372,097; 3,396,093; 3,427,235; 3,477,922; 3,488,266; 3,492,207; 3,493,477; 3,497,430; 3,497,431; 3,501,388; 3,531,387; 3,523,068; 3,523,069; and 3,536,596.

The use of diaphragm cells is old in the immediately foregoing electrolytic processes and in the electrolytic preparation of gases (U.S. Pat. No. 1,581,944). The separation of mixed metalliferous electrolytes through a pair of opposed porous electrodes at voltage too low to cause the metals to electroplate, whereby the ensuing electrically-stressed percolation is stated to yield fairly pure materials in a cascading arrangement, has been shown in U.S. Pat. No. 1,603,298. In another proposal (U.S. Pat. No. 2,905,604) black liquor from sulfate pulping of wood is electrolytically treated to coat out lignin on the anode. The art of electrolytically producing caustic soda and chlorine from sodium chloride is replete with the use of perforate electrodes, as generally is that of electrolyte purification, e.g., acetic acid solutions and the like.

Foraminous electrodes and pairs of electrodes heretofore have been proposed in a variety of electrochemical processing involving drying, filtering, hydrodimerization, purification of electrolytes, desalinization, fuel cell work, and elution electrophoresis. Illustrative of such art are the following U.S. Pat. Nos.: 673,452; 1,918,477; 2,176,343; 2,409,912; 2,640,026; 2,816,067; 2,983,656; 3,061,537; 3,102,085; 3,255,100; 3,441,488; 3,446,725; 3,457,152 and 3,511,765. Also pertinent to this application are my copending U.S. patent applications, Ser. No. 76,311 filed Sept. 28, 1970 (I-1586), Ser. No. 99,120 filed Dec. 17, 1970 (I-1586-3), and Ser. No. 94,267 filed Dec. 2, 1970 (I-1586-5).

In the art of anodic electropainting removal of excess or offending basic ions from the paint bath has been proposed by means of dialysis, ultrafiltration, ion exchange and various species of electrodialysis such as using rigid or deformable or ion exchange membranes. Illustrative of publications in this field include my U.S. Pat. Nos. 3,230,162 and 3,304,250 as well as 3,419,488, 3,496,083 and Japanese patent publication No. 13231/1970 of May 13, 1970. In the electrodeposition of rubber a gas-permeable anode has been proposed for withdrawing gas rearwardly (U.S. Pat. No. 1,583,704).

The instant improvement provides a way for promoting of both addition-type and condensation-type polymerizations which yield polymers (i.e., synthetic resins) that are fluent in the process by virtue of their viscosity or their fineness of dispersion in the liquid medium of the process. Monomer, prepolymer, or oligomer feed that is polymerizable into a fluent polymer is dispersed with electrolyte in an autoionizable liquid bath, such as an aqueous bath, and percolated through a porous, charged d.c. electrode for promoting its polymerization into synthetic resin.

The resin-forming materials for making these fluent polymers in accordance with this invention are dispersed (including actually being dissolved in some cases) with electrolyte in an autoionizable liquid bath. These materials can be electrodeposited in fluent condition at a porous deposition electrode by use of direct current. The resulting deposit is forced through the pores of the electrode. In the ensuing percolation polystructural parts of the apparatus except the electrodes and leads thereto desirably can be made of a non-conducting (electrically-insulating) material such as glass, porcelain or plastic. Alternatively, of course, merization of the material is promoted by heat in the interstices, perhaps also assisted at least in some cases by formations of ionic or free radical species, the low cross-sectional area of the flow paths with attendant high interfacial area thus exposed to the electrode per unit volume of reactants, electroendosmosis, the repulsion of like-charged ions from the electrode, and in some cases by the generation of hydrogen, oxygen, or other byproducts in nascent or molecular state. Heat in the percolation assists in keeping the product polymer fluent, as does its dispersion in the automizable liquid. Fluency should be maintained to prevent plugging of the deposition electrode.

The principal autoionizable liquid for use in this improvement is water. However, other media such as glacial acetic acid, acetic anhydride, HCN, hydrazine, hydroxylamine, $SO_2$, acetonitrile, a nitromethane, dimethylsulfoxide, dimethylformide, liquid ammonia, glycols and alcohols, and tetrahydrofuran, as well as mixtures of such media, are contemplated broadly also in the liquid phase where their corrosive or dangerous properties can be controlled safely and desired electrolytes can be dissolved therein. Operating parameters and materials of construction are, of course, to be selected accordingly. Suitable electrolytes for anionic and/or non-polar resin-formers which are to be attracted to the anode generally are basic ionizable ones, e.g., ammonium hydroxide, amines, and alkali metal hydroxides. Suitable electrolytes for cationic resin-formers blended therewith which are to be attracted to the cathode generally are acidic ionizable ones, and include, for example, acetic acid, sulfuric acid, phosphoric acid, and the like. Dissociating salts also can be useful electrolytes.

The drawing shows in cross-sectional elevation apparatus for polymerizing to make an alkyd (polyester) type resin. Acid anhydride (e.g., phthalic anhydride optionally with some phthalic acid, e.g., o-, m-, or p-phthalic acid) is fed through inlet 2 and polyol (e.g., propylene glycol) is fed through inlet 3 into baffled, agitated, vented and indirectly heated tank 4. The reactants are mixed and heated at about 160°F. for a short time until the half ester is formed. The half ester is then fed through line 5 into bath preparation tank 6 where it is mixed with enough base, alkali metal hydroxide, or the like (e.g., morpholine) and water from line 7 to yield a 15% resin-former solution in water. This solution is recirculated from tank 6 through line 8, recirculating pump 9, and line 11 into chamber 12 of insulating case 13, then back through line 14. Desirably chamber 12 is agitated by feed recirculation of bath and/or mechanical agitation. In the drawing auxiliary pumps, the less essential valves, the instrumentation, electric power supply, and heat exchangers are not shown because they can be conventional but these would be supplied where necessary or desirable.

The anhydride and the polyol are fed in the proportions of about one polyol to 0.8 acid equivalents. The remainder of the acid equivalents to essentially equal the polyol equivalents are made up of linseed oil fatty acids, or the dimers and trimers thereof. These can be partially or fully neutralized with alkali such as an amine and fed gradually into case 13 through inlet 15. Alternatively and preferably they can be fed directly into tank 4 or into bath preparation tank 6. If the neutralized fatty acids are fed through inlet 15, they enter chamber 16 and pass into zone 12 through porous electrode 17 charged as a d.c. cathode by electrical lead 18 by the power supply (not shown). Otherwise they enter zone 12 through line 11. The cell comprises chambers 12, 16 and 22. The cell is vented by circulation in line 14 and can have also auxiliary vents, not shown. Item 19 is a porous deposition electrode (e.g., stainless steel). It is charged anodically with d.c. power by electrical lead 21 from the power supply. The pores communicate into discharge chamber 22. The resulting alkyd polymer that percolates through electrode 19 can be drawn off as a syrup or an aqueous slurry through outlet 23. Alternatively, it can be drawn off in aqueous dispersion by opening bleed 24 and permitting liquor and polymer to flow through electrode 19 a little faster than the resin-forming material is transported to the electrode, thereby cooling the electrode to some extent. This material can be recycled back to chamber 12 directly by means not shown, or separated, as by decantation, filtration, settling, drying, centrifuging, or the like, from dispersed polymer with the water-enriched phase being returned to tank 6 if desired. Periodically aqueous base can be purged through line 25 to maintain the original acid:base equivalent ratio.

A voltage of about 10 to as high as about 400–500 volts can be impressed across electrodes whereby the alkaline feed mixture migrates to and concentrates at electrode 19. The deposit is forced therethrough by a slight differential pressure from the left side of electrode 19 descending to the right side. Back pressure on the deposition electrode can be adjusted by throttle-valving polymer line 23 and/or bleed line 24. Temperature of the operation is maintained in the mass of liquor in chamber 12 at about 100°–130°F. after the operating has been going a while. The temperature within the interstices of porous electrode 19 is a good deal higher than that of the liquor in chamber 12. The temperature of electrode 19 can be controlled by power input into the bath, e.g., changing the voltage upwards to use more power and generate more heat, or increasing the electrical conductivity of the bath with additional electrolyte or vice versa, making the deposition electrode 19 smaller than electrode 18, or bleeding and recirculating a controlled rate of water-rich liquor from line 24 and/or 23 as previously described. Additionally, porous electrode 19 can be built with coils within or around it for passage of indirect heating or cooling fluids and cooling by conduction.

While the drawing has been described in connection with a polyester resin, essentially the same cell apparatus could be fed with an aqueous emulsion of styrene, methylmethacrylate, and methacrylic acid dispersed with morpholine and/or KOH entering into chamber 12 by line 11. If desired in such addition polymerization, a conventional free radical or redox catalyst, e.g., hydrogen peroxide, benzoyl peroxide, methyl ethyl ketone peroxide, a persulfate, or the like could be added in minute dosage, e.g., 0.001 to 0.04 weight percent of the charged monomers. The resulting polymer would be withdrawn as previously described either through line 23 and/or bleed 24. Desirably chamber 12 is operated substantially full at all times.

The porous deposition electrode can be built of or contain on at least some of its surfaces a contact catalyst for the polymerization, e.g., nickel, iron, cobalt, copper, or a precious metal such as platinum, palladium, etc. Temperature of the deposition electrode is regulated to achieve the desired heat control as previously described. Advantageously, for best operation the temperature and pressure in the apparatus is maintained so that there are no undesirable emissions or boiling of materials in the chambers. Pressure can be used on the apparatus to suppress boiling. On the other hand, the pressure can be reduced so that some of the media or some fraction of other liquid or dissolved vapor in process vaporizes to provide evaporative cooling for the operation. Temperatures up to several hundred degrees Fahrenheit in the bulk liquor of the cell and yet much higher at the interfaces between the deposition electrode pores and the resin-formers are quite feasible.

Absolute permeability of porous electrodes for use in this invention is defined in and can be tested in accordance with the procedure shown in proposed *SAE Aeronautical Information Report* (*AIR-887*), Mr. Robert I. Gross, 1965, Aircraft Porous Media, Inc., Glen Cove, N.Y., designated as APM-FSR-26.

The electrodes advantageously are made of metal, e.g., A.I.S.I. 300 and 400 series stainless steels, monel, nickel, Inconel, or the like, and are best substantially inert to attack by all of the components of the liquor. Alternatively, they can be built of electrically-conductive carbon such as graphite or of metal-coated ceramic or plastic, or the like, or even one or more very fine electrically-conductive screens or sieves, or powdered metal pressed and sintered onto a screen. Such electrodes need not be a self-supporting, but can be enclosed in a coarsely foraminous support casing if desired. The preferred porous electrodes are porous austenitic stainless steel plates because of their effectiveness, their resistance to attack, and their structural strength. Ordinarily many of these are scaled alphabetically typically as follows by the Pall-Trinity Micro Corporation, Cortland, New York, U.S.A.

under even slight pressure differentials across the electrode of a few inches of water. If at least the porous deposition electrode face toward the liquid in the cell is covered with a non-conducting porous filtering barrier such as a Dutch twill cotton or synthetic cloth or the like, this element can act to retain heat about such electrode, as well as to restrain liquid flow through the electrode, stop penetration of coarse solids, and act as a liquor-stilling member to restrict turbulence at the face of the porous electrode. The porosity of such barrier can be from a few microns up to several hundred or even more, and preferably it is fairly coarse.

The voltage between anode and cathode of cell apparatus should be net unidirectional. It can be pulsed or have shaped nodes, but preferably is rectified a.c. with not more than about a 15% ripple factor for smoothest results. Where straight-line d.c. power is available this power, of course, can be used with excellent effect. The voltage used usually is above that necessary to electrically dissociate some of the autoionizable liquid medium in the cell and high enough to drive the resin-forming material towards the deposition electrode.

What should be understood in this connection is that such electrodepositing material is not being redispersed in the bulk of the medium at a rate as fast as it is being accumulated at such electrode. When the resinous material is being removed with more or less autoionizable liquid medium through the porous deposition electrode at a fairly high rate, the voltage used can reach over 400 volts in some cases before net deposition effectively beings to electrically insulate the porous deposition electrode. Such net deposition can be noted most sensitively by a leveling off or decrease in amperage flow through the cell as the deposition electrode becomes coated, and thus is the minimum deposition volt-

|  | C | D | E | F | G | H |
|---|---|---|---|---|---|---|
| Mean Pore Size, Microns | 165 | 65 | 35 | 20 | 10 | 5 |
| Absolute Porosity for Liquids, Microns | 160 | 55 | 35 | 25 | 15 | 12 |

Obviously more than one anode and one cathode can be used, e.g., in parallel connection, and all need not be permeable.

The deposition electrode should have a fair bed depth, at least about one thirty-second inch and preferably one-sixteenth inch to one-fourth inch or more, to provide an appropriate electrical field. An even thicker bed can be used if it has virtually no electrical resistance, e.g., one-half inch and up. The absolute porosity for liquids for such deposition electrode can be effective up to 200+ microns (and even higher if it is covered with a less porous insulating filter barrier such as a membrane or mat of glass fiber, synthetic fiber, paper, or the like). Advantageously the absolute porosity of the deposition electrode is at least about 10 microns and preferably between about 25 and 200 microns. If the absolute porosity for liquids is much below about 600–800 millimicrons, the flow rate therethrough can be diminished a great deal and plugging is more apt to occur. If too coarse, the electrode is often comparatively ineffective for separation of the resin-formers and resin from the flush of electrolyte therethrough age for that electrode in that system under the prevailing conditions. Minimum deposition voltage also is discussed in my copending U.S. patent application, Docket I-1586-3 (Ser. No. 99,120 filed on Dec. 17, 1970). Agitation of the liquor in the deposition process, concentration of the electrolytes present, pH, temperature, and electrical conductivity of the liquor connecting the electrodes also affect the minimum deposition voltage for a particular operation.

The molecular weight of the polymers produced in accordance with this invention can be from several hundred up to many thousand, provided that such polymer product is fluent in the apparatus under the extant operating conditions, which advantageously are maintained such as to preclude substantial depolymerization or other destruction of the product. Ordinarily pressure of at least a few inches of water, and optionally much higher, is impressed across the deposition electrode by pump pressure from the feed or feeds into the cell. Pressure, of course, can be applied to the deposition electrode by other means such as pressure rolls, pistons, squeegees, and the like. Most, if not all, of the such structures can be of metal that is coated with such substances.

Resin-formers (e.g., monomers and oligomers) having carboxyl groups and being ionized in water generally migrate to an anode in a strong direct current field, as well as do substantially non-polar resin-formers dispersed in water and also dispersed resin-formers of lesser anodic polarity in process. These less polar or non-polar resin-formers can be used in the absence of or in admixture with the carboxylic acid resin-forming materials. Amino resin-formers such as aminoalkyl esters of acrylic or methacrylic acids and the like, when ionized with acid and dispersed in water, then subjected to electrolysis, generally migrate to a cathode; like the acidic resin-formers, such basic ones can take with them resin-formers of lesser cathodic polarity, and also ones that are substantially non-polar. Preferably the feed contains an appreciable fraction (e.g., 3–100 weight percent) of ionized carboxylic acid resin-former for migration to a porous anode, or a like fraction of ionized amino resin-former for migration to a porous cathode.

The choice of liquid medium and its dissolving effect on the resin-formers can affect the migration. Various aminoplasts, particularly those which form fine dispersions of discrete particles rather than clear solutions in water, can migrate in aqueous baths with either resin-forming anions or resin-forming cations, and their crosslinking with labile hydrogens in the resulting resinous materials can be accelerated with acid catalysts such as toluene sulfonic acid (which can be included in the bath in minute proportions for transport and inclusion with such resin-formers). Such acids can be helpful also to catalyze esterification reactions.

As indicated previously, the process is useful for promoting the polymerization of otherwise conventionally polymerizable monomers, further conventionally polymerizable prepolymers (low molecular weight, fluent polymers having up to about 2000–2500 M.W.), and further conventionally polymerizable oligomers (polymers comprising up to four monomer units) either in condensation or addition polymerization processes. As referred to herein, these all are "resin-formers"; their polymerizability by conventional methods of cooking, with or without catalyst present and often with continuous byproduct removal, are well known. The production of polyesters, polyamides, polyimides, polyamides-/imides, and polyethers can be promoted and thus enhanced by the instant improvement, at least up to that degree of reaction where byproducts present from the reaction tend to accumulate and retard or reverse the reaction as equilibrium is approached. Byproducts can be separated by various means from the bath liquor using known methods, e.g., dialysis, electrodialysis, reverse osmosis, ultrafiltration, distillation, the electrically-stressed filtration of my copending U.S. patent application, Ser. No. 94,267 (I-1586-5), and the like, periodically or continuously to keep the bath characteristics substantially constant.

The homopolymerization and copolymerization of various vinyl monomers (including acrylic and vinylidene monomers for the purpose of this specification) such as, prepolymers and oligomers comprising reactive units such as styrene, vinyl toluene, and related vinyl hydrocarbons, methylmethacrylates, methylacrylate and related lower alkyl acrylates, methacrylates and acrylic esters and ethers, acrylic acid, alkylacrylic acids, crotonic acid and related unsaturated acids and their esters, acrylamide, vinyl and vinylidene halides, acrylonitrile and related nitriles, vinyl ethers, vinyl esters, e.g., vinyl acetate, vinyl ketones, and the like can be promoted in accordance with the principles of my process improvement. The resinification of unsaturated oligomers with multiple unsaturation, e.g., methacrylic, acrylic, and allyl esters with polythiols can also be promoted. Other resin-former unsaturated compounds with other than vinyl or acrylic carbon-to-carbon unsaturation such as allylic materials, e.g., diallyl phthalate, maleic anhydride (in anhydrous medium), tetrafluoroethylene, haloprenes, isoalkylene and polyene hydrocarbons, e.g., isobutylene, butadiene or myrcene, can be treated similarly when they can be dispersed (or dissolved) in water or other autoionizable medium, under pressure if necessary, to form a fairly stable mixture in the presence of current-carrying electrolyte and, optionally, other conventional stabilizing agents such as fatty acid or sulfonate soaps, nonionic and cationic dispersants, etc. In some cases it can be advantageous to swell a fine polymer particle or droplet with reactive monomers or oligomers for processing in accordance with this invention to obtain desired resinous products.

The following examples further delineate this invention, but should not be construed as limiting it. Herein all parts are parts by weight, all percentages are by weight, and all degrees are degrees Fahrenheit, unless otherwise expressly indicated. Nonvolatile matter (NVM) is reckoned as the residue on curing a sample of the subject mixture at 350°F. for 50 minutes.

EXAMPLE 1

Maleinized tall oil fatty acids (948 parts of commercial tall oil fatty acids previously heat reacted with 155 parts of maleic anhydride at 450° for 1 hour) are cooked with 503 parts of pentaerythritol and 394 parts of phthalic anhydride at 340° for a short time until Acid Number of about 300 is reached. 100 parts of this prepolymer are mixed with water at 165° and morpholine, then finally reduced with water to form a 10 weight % solution of the resin-former in water having 130 meq. of the base per liter.

This solution is circulated at 100°–120°F. from a feed reservoir, through a chamber (like item 12 of the drawing) at 4 psig between porous electrodes of a d.c. electrolytic cell like that of the drawing (except that no fatty acid is fed to the process separately through line 15) then back to the feed reservoir. The electrodes are E porosity A.I.S.I. 316 stainless steel plates made by the Pall-Trinity Micro Corporation. These advantageously can have a porous cotton twill cloth (hand-towelling) disposed in front of their faces facing chamber 12 to restrict turbulence at these faces, but, in the initial experiment described herein, does not have such cloth. The pressure across electrode 19 is slightly less than one psig regulated by valve on line 23. Both electrodes were one-eighth inch thick.

Line 24 is closed, and a d.c. voltage of 400 is impressed across the electrodes. Resinous polymer collects at and passes through anode 19 with water, flows in zone 22 and is withdrawn with additionally heated aqueous dispersion through line 23. This polymer product has Acid Number of 105, indicating that substantial and rapid condensation polymerization has been caused to occur in this electrically-stressed percolation operation. Periodically a mixture consisting essentially of base and water can be purged slowly from the system out of line 25 to keep the ratio of acid equivalents to base equivalents in the recirculating solution at about its original value.

EXAMPLE 2

A coupled glyceride drying oil is made by heating in an agitator tank 8467 parts of an alkali-refined linseed oil and 2025 parts of maleic anhydride at 450° for about 3 hours until Acid No. between 80 and 90 results, then cooling this intermediate to 315°, adding 1789 parts of vinyl toluene containing 48 parts of ditertiary butyl peroxide, and further reacting at 425° for about 1 hour. The resulting product (a "prepolymer" of about 1200–1300 M.W.) is blended with morpholine and water at 165°, then further reduced with water to yield a 10% solution of such resulting product in water having 130 meq. of the base per liter.

The aqueous solution is circulated at about 110°–120° from a feed reservoir, through the chamber between porous electrodes of the d.c. electrolytic cell made and operated like that of Example 1, and back to the feed reservoir. Finished resinous polymer mixed with water at increased temperature up to about boiling is withdrawn through line 23. This polymer product undergoes an appreciable rise in molecular weight because of further polymerization, both from further addition polymerization and further condensation polymerization. The base to acid ratio can be maintained as in Example 1.

Further relevant art, which can be adapted for utilization in conjunction with the instant improvement, includes U.S. Pat. No. 3,554,882. This patent teaches the initiated and sensitized polymerization and cathodic deposition from acidified dispersions of various ethylenically unsaturated compounds such as acrylamides, substituted acrylamides, acrylic and substituted acrylic compounds, vinyl and substituted vinyl compounds, styrene, and N-vinyl-2-pyrrolidone. Of remoter collateral interest also is the electrodialysis and related arts of electrostratification and electrodecantation of Pauli and others, summarized in the article of Paul Stamberger, *Journal of Colloid Science*, Vol. 1, pages 93–103.

What is claimed is:

1. In a process for polymerizing resin-forming material that polymerizes into a fluent polymer in contact with a charged electrode surface, the improvement which comprises:
   a. establishing and maintaining a reaction mixture in an electrical cell zone having as a boundary area a porous, electrically charged d.c. electrode at least about one thirty-second inch thick, the electroconductive portion of which is formed of a material selected from the group consisting of metals and electroconductive carbon,
   said porous electrode having an absolute porosity within the range of about 600 millimicrons to about 200 microns and providing fluid communication between said cell zone and a collection zone,
   said reaction mixture comprising said resin-forming material dispersed with electrolyte in an aqueous liquid bath;
   b. concentrating, by electrodeposition at said porous electrode, said resin-forming material; and
   c. establishing and maintaining a high-to-low pressure gradient between said cell zone and said collection zone, thereby forcing the resulting concentrate through said porous electrode into said collection zone, thus effecting a stage of separation between said concentrate of resin-forming material and the other components of said reaction mixture in said cell zone while electrically stressing said concentrate.

2. The process of claim 1 wherein said porous electrode has a thickness between about one thirty-second and about one-half inch.

* * * * *